J. G. NOLEN.
VALVE.
APPLICATION FILED SEPT. 6, 1904.
962,660.
Patented June 28, 1910.
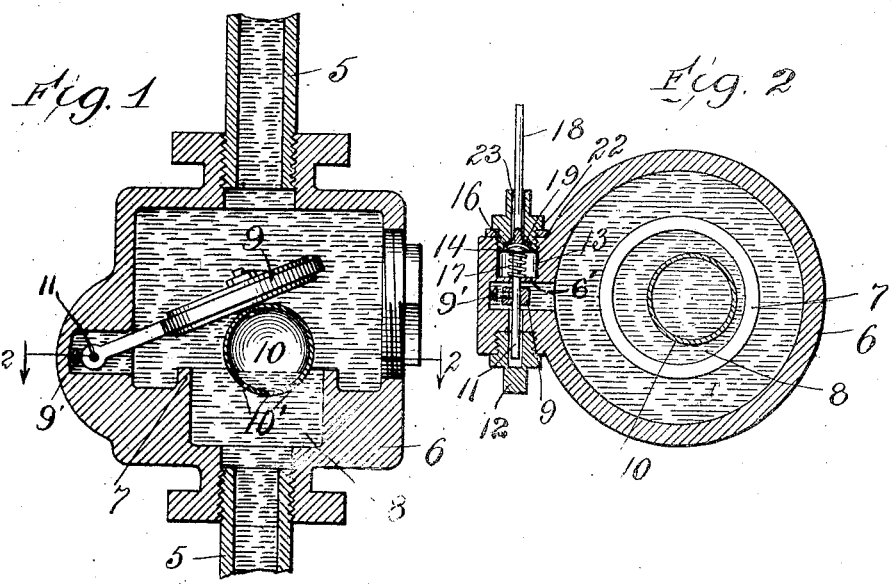
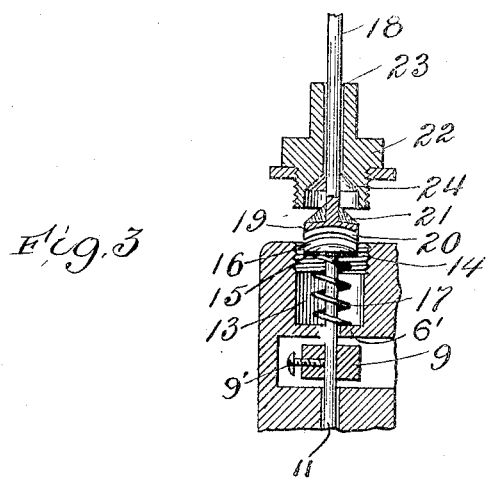
Witnesses
Ray White
Harry R. Little
Inventor:
James G. Nolen
By Josée Bain Atty.

UNITED STATES PATENT OFFICE.

JAMES G. NOLEN, OF CHICAGO, ILLINOIS, ASSIGNOR, BY MESNE ASSIGNMENTS, TO AUTOMATIC FIRE PROTECTION COMPANY, A CORPORATION OF MAINE.

VALVE.

962,660.

Specification of Letters Patent.   Patented June 28, 1910.

Application filed September 6, 1904. Serial No. 223,535.

*To all whom it may concern:*

Be it known that I, JAMES G. NOLEN, of Chicago, in the county of Cook and State of Illinois, have invented certain new and useful Improvements in Valves; and I hereby declare that the following is a full, clear, and exact description thereof, reference being had to the accompanying drawings, which form part of this specification.

My invention relates to improvements in valves, and has for a salient object to provide a pivoted valve, such as a check valve, wherein the pivotal stem extends to the exterior of the valve, wherein the construction is such as to do away with the necessity of packing the joint made by the stem and the casing.

A further object of my invention is to provide such a flexible connection between the pivotal stem proper of the valve and the stem extension projecting from the exterior of the casing, that distortion or displacement of the stem proper will not affect the joint between the stem extension and the casing member.

A yet further object is to provide a gravity check valve in which the movable member is normally maintained in open position when the valve casing is full of water.

Other and further objects will become apparent from the following description, and the appended claims, taken in conjunction with the accompanying drawings, wherein, Figure 1 is a transverse vertical section of a valve embodying my invention. Fig. 2 is a horizontal cross section on line 2—2 of Fig. 1. Fig. 3 is an enlarged development of some of the parts shown in Fig. 2.

Throughout the drawings like numerals of reference refer always to like parts.

In the drawings 5—5 indicates generally two pipe sections connected by a valve casing 6. The casing 6 may be of any suitable construction to provide a seat 7 surrounding a chamber 8 of suitable size to receive a float to be hereafter described; and to afford bearings for the parts to be specified.

9 indicates a valve proper, having securely attached to its under surface a float 10, preferably a hollow ball adapted to be partially filled with air and preferably provided with perforations 10' near the bottom thereof, so that the float when immersed acts like a diving bell. The float 10 should be of such buoyancy that when the casing is filled with water the valve 9 and its associated parts are maintained in raised position.

The valve 9 is secured to a pivoted stem 11 as by a set screw 9' so that it oscillates with the stem 11. The portion of the stem to which the valve is directly secured, and which I will advert to as the stem proper, (to distinguish it from another stem-portion to be described) finds bearing on one side in a suitable water-tight part 12, in which it may preferably have some longitudinal play, and at its opposite end projects into a recess 13 made in one side of the valve casing 6. At said end the stem 11 is provided with a head 14, preferably presenting a curved surface 15, and provided with a projecting feather 16 extending preferably centrally thereacross. Between the head 14 and the abutment 6' which forms the end of the recess 13 is interposed a spring 17 which bears against the head 14 and tends constantly to press the stem to its outward limit of movement.

18 indicates a portion of the stem which I will term the stem-extension, provided on its inner end with a head 19 shaped to correspond with the curved portion 15 of the head 14 of the stem proper, and provided with a kerf 20 to loosely receive the feather 16. The head 19 is provided with a suitable bearing surface 21, preferably conical in form, which may be a ground surface integral with the head 19, as shown in Fig. 2, or may be, as illustrated in Fig. 3, a body of glass, agate or other suitable hard material fitted on the stem.

22 indicates a cap screw-threaded for engagement with the threaded end of the recess 13 to close the same, and provided with an aperture 23 through which the stem extension 18 projects, said aperture 23 terminating in a ground seat 24 shaped to conform with the bearing member 21 of the stem extension.

The parts are assembled in the relation shown in Fig. 2, and it will be apparent that spring 17 exerting its tension against the head 14, of the stem proper, presses the associated stem extension outwardly, so that its bearing portion 21 makes intimate contact with the beveled seat 24. Further, it will be noted that the coacting curved surfaces 15 of the heads 14 and 19 connected against relative rotation by the feather 16, form a flexible joint, giving the stem portions 11 and 18 considerable play relative to each other without disturbing their operative connection for movement together. This arrangement insures the proper and exact setting of the bearing member 21, without reference to the exact alinement or other conditions of the stem-proper 11, so that displacement of the valve stem proper 11, due to inequality in wear, or unbalanced strains thereon, has no effect to loosen the joint between the stem extension and the casing part with which it coacts.

It will be apparent that when the float is employed in the valve, the valve will be unaffected by water flow but will close upon a drop of the water level below the level of the float, but the float might be omitted and the valve employed as an ordinary check valve.

While I have described in some detail an operative embodiment of my invention, it will be apparent that slight changes might be made from the exact construction shown without departing from the spirit and scope of my invention.

Having described my invention, what I claim and desire to secure by Letters Patent of the United States, is:—

1. In a valve, a casing providing a valve seat, a recess opening extending inwardly from the exterior of the casing, a valve-member, a stem-part associated with the valve, extending into said recess, and provided with a curved head arranged in said recess, a spring between said head and the bottom of the recess, a cap covering the mouth of said recess, and having an aperture therethrough surrounded with a bearing surface, a second stem part arranged to project through said aperture and seat on said bearing surface, and means connecting the valve stem-parts for rotation.

2. In a valve comprising a casing, an oscillating flap valve, a stem to which said oscillating flap valve is secured projecting through the valve casing and comprising two parts having complementary coacting curved heads, one provided with a recess and the other with a projection engaging said recess, a bearing surface on that stem part which extends to the exterior of the casing, and a seat for said surface in the casing.

In testimony that I claim the foregoing as my own, I affix my signature in presence of two witnesses.

JAMES G. NOLEN.

In presence of—
  GEO. T. MAY, Jr.,
  MARY F. ALLEN.